US012696356B2

(12) United States Patent
Huang

(10) Patent No.: US 12,696,356 B2
(45) Date of Patent: Jul. 28, 2026

(54) ELECTRIC BLANKET

(71) Applicant: Wanglai Huang, Beijing (CN)

(72) Inventor: Wanglai Huang, Dongguan City (CN)

(73) Assignee: Wanglai Huang, Beijing (CN)

( * ) Notice: Subject to any disclaimer, the term of this patent is extended or adjusted under 35 U.S.C. 154(b) by 1050 days.

(21) Appl. No.: 17/864,348

(22) Filed: Jul. 13, 2022

(65) Prior Publication Data

US 2023/0345586 A1 Oct. 26, 2023

(30) Foreign Application Priority Data

Apr. 25, 2022 (CN) ......................... 202210436941.4

(51) Int. Cl.
*H05B 3/34* (2006.01)
*H05B 1/02* (2006.01)

(52) U.S. Cl.
CPC ........... *H05B 3/342* (2013.01); *H05B 1/0272* (2013.01)

(58) Field of Classification Search
CPC .............................. H05B 3/342; H05B 1/0272
USPC ........................................................ 219/622
See application file for complete search history.

(56) References Cited

U.S. PATENT DOCUMENTS

2014/0034628 A1* 2/2014 Chen .................... H05B 1/0272 219/212
2020/0163162 A1* 5/2020 Lightsey ............. H05B 1/0272

FOREIGN PATENT DOCUMENTS

CN 202211472 U * 5/2012
CN 202664977 U * 1/2013

* cited by examiner

*Primary Examiner* — Steven W Crabb
*Assistant Examiner* — Alba T Rosario-Aponte
(74) *Attorney, Agent, or Firm* — Leong C. Lei

(57) ABSTRACT

An electric blanket includes an electric blanket body and a power supply device. The power supply device includes a power plug, a main control module, and a first interface. The main control module includes a main control circuit, an output control circuit, a voltage conversion circuit, and a first communication power supply circuit for power supply and signal transmission and reception. The first interface has a first conductive terminal, a second conductive terminal, and a third conductive terminal.

10 Claims, 9 Drawing Sheets

ELECTRIC BLANKET

BACKGROUND OF THE INVENTION

1. Field of the Invention

The present invention relates to an electric blanket, and more particularly to an electric blanket that can be used conveniently.

2. Description of the Prior Art

An electric blanket, also known as an electric mattress, is a contact-type electric heating appliance. A special soft, serpentine electric heating element with a standard insulation performance is disposed in the blanket to emit heat when it is energized. Warm compresses, electric heating mattresses and electric heating pads also have the same working principle as the electric blankets that can keep warm.

A conventional electric blanket generally includes an electric blanket body and a power adapter for power supply. The function buttons used to control the working state of the electric blanket body are generally disposed on the power adapter. Electric wires are connected between the power adapter and the electric blanket body. When the user wants to use the electric blanket, he/she needs to go to the position where the power adapter is located. This brings inconvenience to the use. In addition, two power cables and two signal cables are often required for electrical connection between the power adapter and the electric blanket body. The circuit cost is high.

Accordingly, the inventor of the present invention has devoted himself based on his many years of practical experiences to solve these problems.

SUMMARY OF THE INVENTION

In view of the shortcomings of the prior art, the primary object of the present invention is to provide an electric blanket that can be used conveniently. It brings convenience for use. Only three sockets are needed at the interface connection of the electric blanket, which reduces the number of power cords, simplifies the overall circuit, and reduces circuit costs.

In order to achieve the above object, the present invention adopts the following technical solutions.

An electric blanket comprises an electric blanket body and a power supply device for power supply and control.

The power supply device includes a power plug for electrical connection to an alternating-current electric power supply, a main control module for voltage conversion and control, and a first interface for electrical connection to the electric blanket body.

The main control module includes a main control circuit, an output control circuit, a voltage conversion circuit for converting the alternating-current electric power supply, and a first communication power supply circuit for power supply and signal transmission and reception. The main control circuit is electrically connected to the output control circuit and the first communication power supply circuit. The output control circuit has an N3 terminal. The first communication power supply circuit has a COMM1 terminal and a GND1 terminal. The first interface has a first conductive terminal, a second conductive terminal, and a third conductive terminal. The third conductive terminal is electrically connected to the N3 terminal. The first conductive terminal is electrically connected to the COMM1 terminal. The second conductive terminal is electrically connected to the GND1 terminal.

A controller and a second interface are disposed on an outside of the electric blanket body. The second interface is pluggably connected to the first interface. The controller includes a signal processing circuit, a function button circuit, and a second communication power supply circuit for separating a power supply and a signal provided by the main control module. The signal processing circuit is electrically connected to the function button circuit and the second communication power supply circuit. The second communication power supply circuit has a COMM2 terminal and a GND2 terminal.

The second interface has a fourth conductive terminal, a fifth conductive terminal, and a sixth conductive terminal. The fourth conductive terminal is electrically connected to the COMM2 terminal. The fifth conductive terminal is electrically connected to the GND2 terminal. A heating load is disposed inside the electric blanket body. One end of the heating load is electrically connected to the sixth conductive terminal. Another end of the heating load is electrically connected to the fifth conductive terminal.

The first interface is connected to the second interface. The third conductive terminal is electrically connected to the sixth conductive terminal. The first conductive terminal is electrically connected to the fourth conductive terminal. The second conductive terminal is electrically connected to the fifth conductive terminal.

Compared with the prior art, the present invention has obvious advantages and beneficial effects. Specifically, the main control circuit is disposed on the power supply device and the controller used for button operations is disposed on the electric blanket body, which brings convenience for use. In particular, through the cooperation of the first communication power supply circuit and the second communication circuit, the functions of providing power supply and sending and receiving signals can be integrated on the same power cord. That is, only three sockets are needed at the interface connection of the electric blanket which reduces the number of power cords, simplifies the overall circuit, and reduces circuit costs.

Secondly, through the cooperation of the voltage detection circuit and the current detection circuit, the safety and reliability of the product are further improved.

The design of the overall circuit is ingenious and reasonable, which ensures the stability and reliability of the product in use.

In order to illustrate the structural features and effects of the present invention more clearly, the following detailed description will be given in conjunction with the accompanying drawings and specific embodiments.

DETAILED DESCRIPTION OF THE PREFERRED EMBODIMENTS

Figure 1:
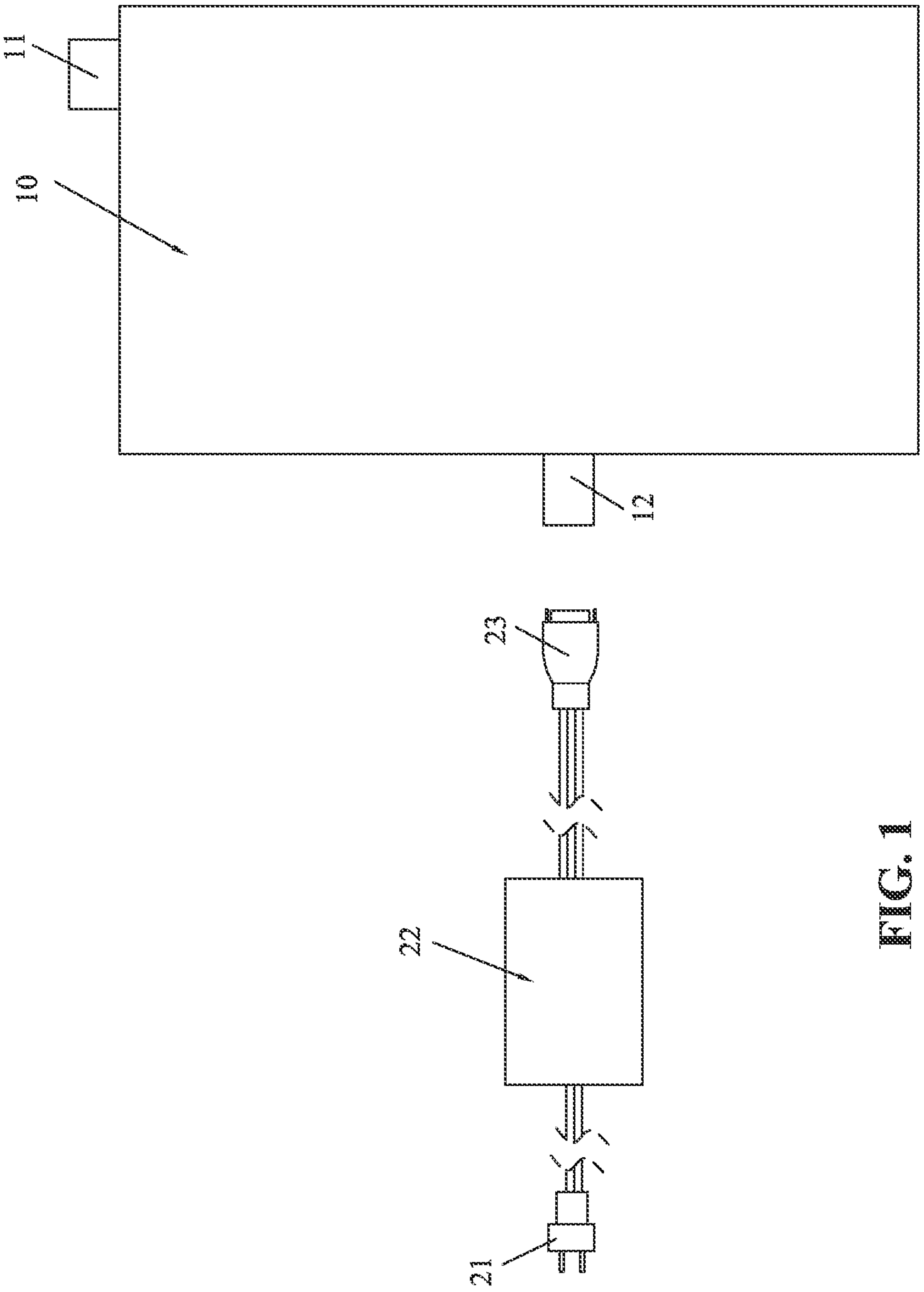
FIG. 1 is a top view of a preferred embodiment of the present invention, wherein the electric blanket body and the power supply device are not electrically connected.
Figure 2:
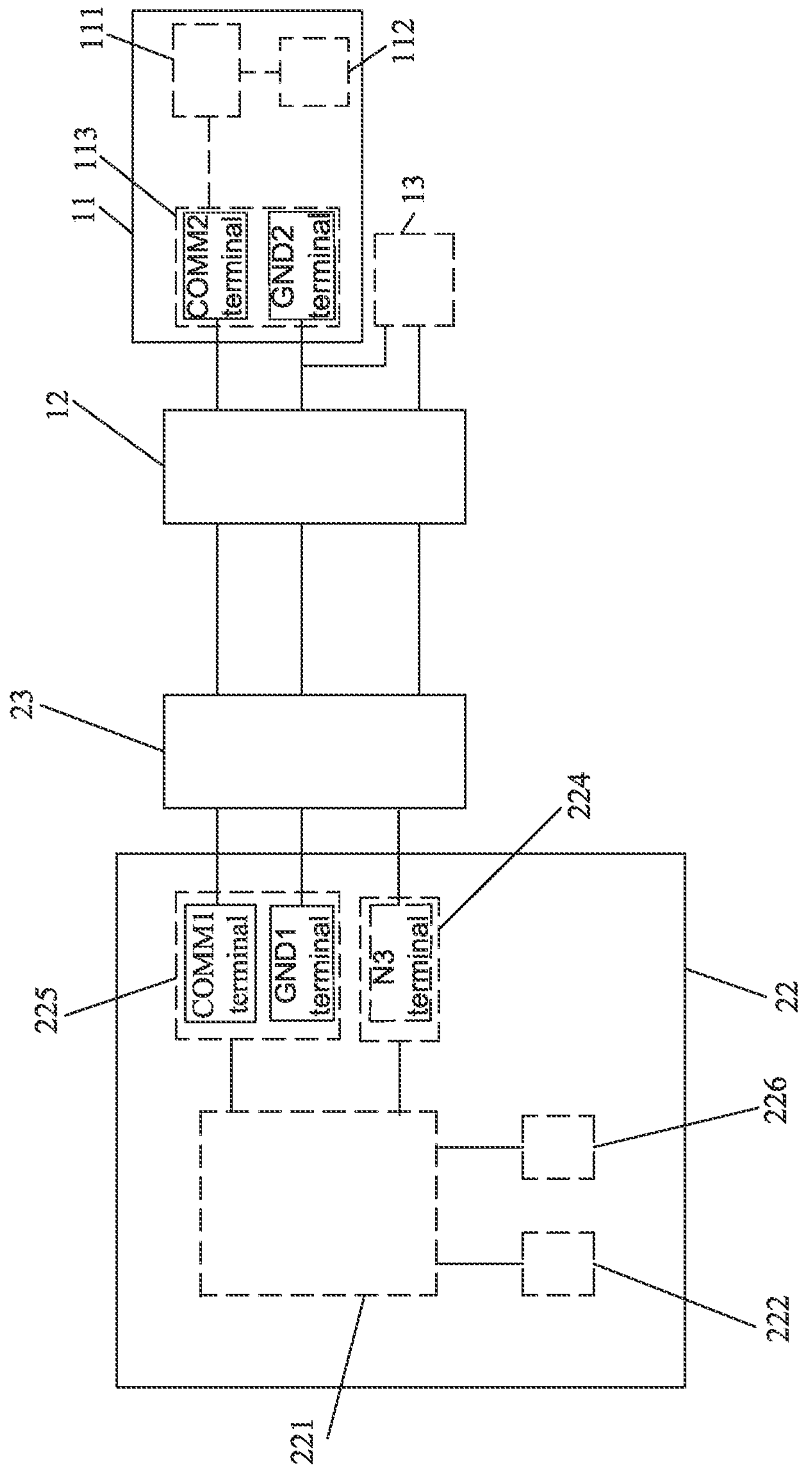
FIG. 2 is a block diagram of the preferred embodiment of the present invention.

Embodiments of the present invention will now be described, by way of example only with reference to the accompanying drawings.

As shown in FIG. 1 through FIG. 9, the present invention discloses an electric blanket that can be used conveniently. The electric blanket comprises an electric blanket body 10 and a power supply device for power supply and control.

The power supply device includes a power plug 21 for electrical connection to an alternating-current electric power supply, a main control module 22 for voltage conversion and control, and a first interface 23 for electrical connection to the electric blanket body 10.

The main control module 22 includes a main control circuit 221, a current detection circuit 222, a voltage detection circuit 226, an output control circuit 224, a voltage conversion circuit 223 for converting the alternating-current electric power supply and a first communication power supply circuit 225 for power supply and signal transmission and reception.

Figure 3:
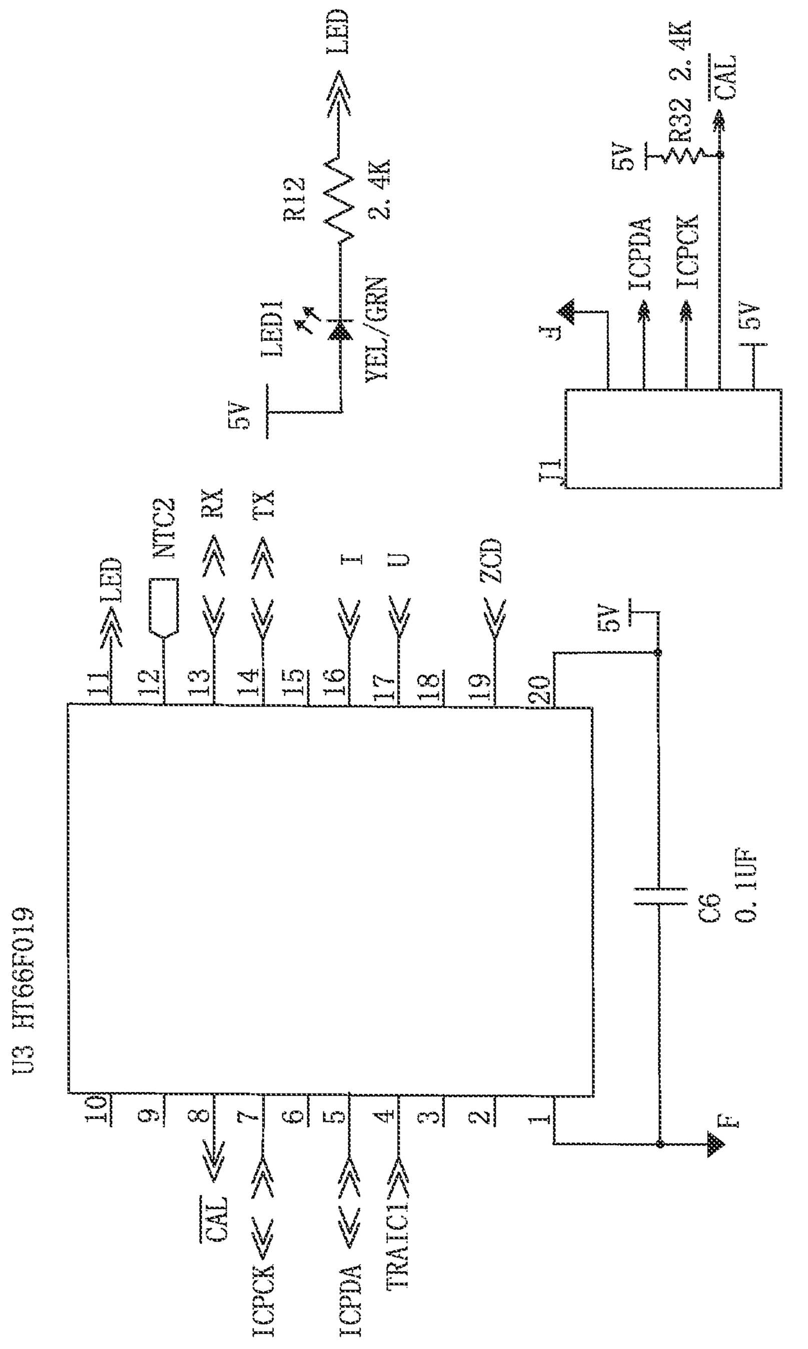
FIG. 3 is a schematic diagram of the main control circuit of the preferred embodiment of the present invention.

The main control circuit 221 is electrically connected to the output control circuit 224 and the first communication power supply circuit 225. In this embodiment, as shown in FIG. 3, the main control circuit 221 includes a main control chip U3, an indicator LED1, and a resistor R12. The main control chip U3 has main control pins 1 to 20.

The main control pin 11 is electrically connected to the cathode of the indicator LED1 through the resistor R12. The anode of the indicator LED1 is electrically connected to a 5V voltage terminal of the voltage conversion circuit. 223. The main control pin 13 and the main control pin 14 are electrically connected to the first communication power supply circuit 225. The main control pin 4 and the main control pin 12 are electrically connected to the output control circuit 224.

Figure 5:
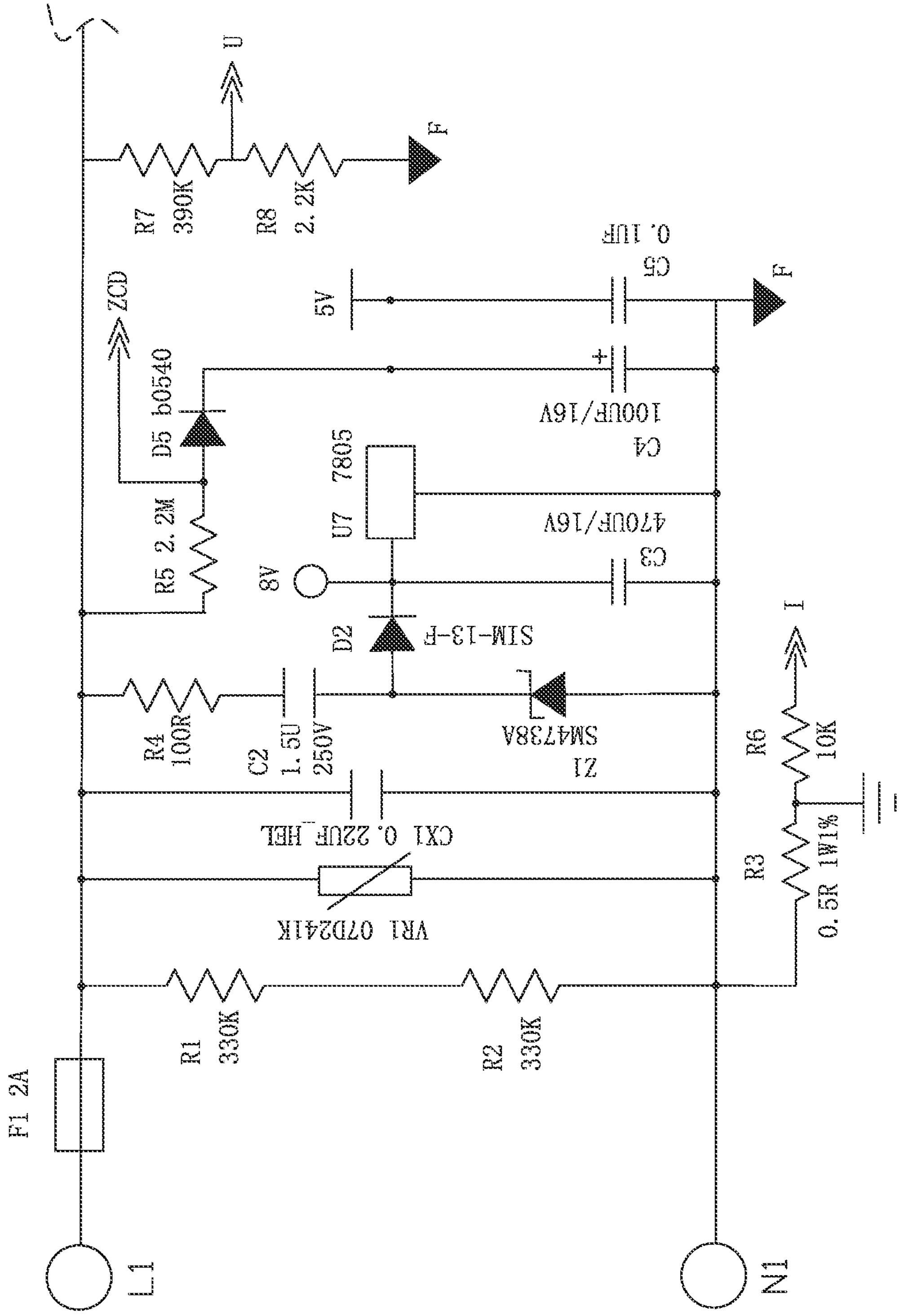
FIG. 5 is a schematic diagram of the voltage conversion circuit of the preferred embodiment of the present invention, illustrating the current detection circuit and the voltage detection circuit.

As shown in FIG. 5, the current detection circuit 222 includes a resistor R6 and a resistor R3 that are connected in series. The connection node of the resistor R6 and the resistor R3 is grounded. The other end of the resistor R6 is electrically connected to the main control pin 16. The other end of the resistor R3 is electrically connected to the voltage conversion circuit 223.

As shown in FIG. 5, the voltage detection circuit 226 includes a resistor R7 and a resistor R8 that are connected in series. The connection node of resistor R7 and resistor R8 is electrically connected to the main control pin 16. The other end of the resistor R8 is pounded. The other end of the resistor R7 is electrically connected to the voltage conversion circuit 223.

Figure 6:
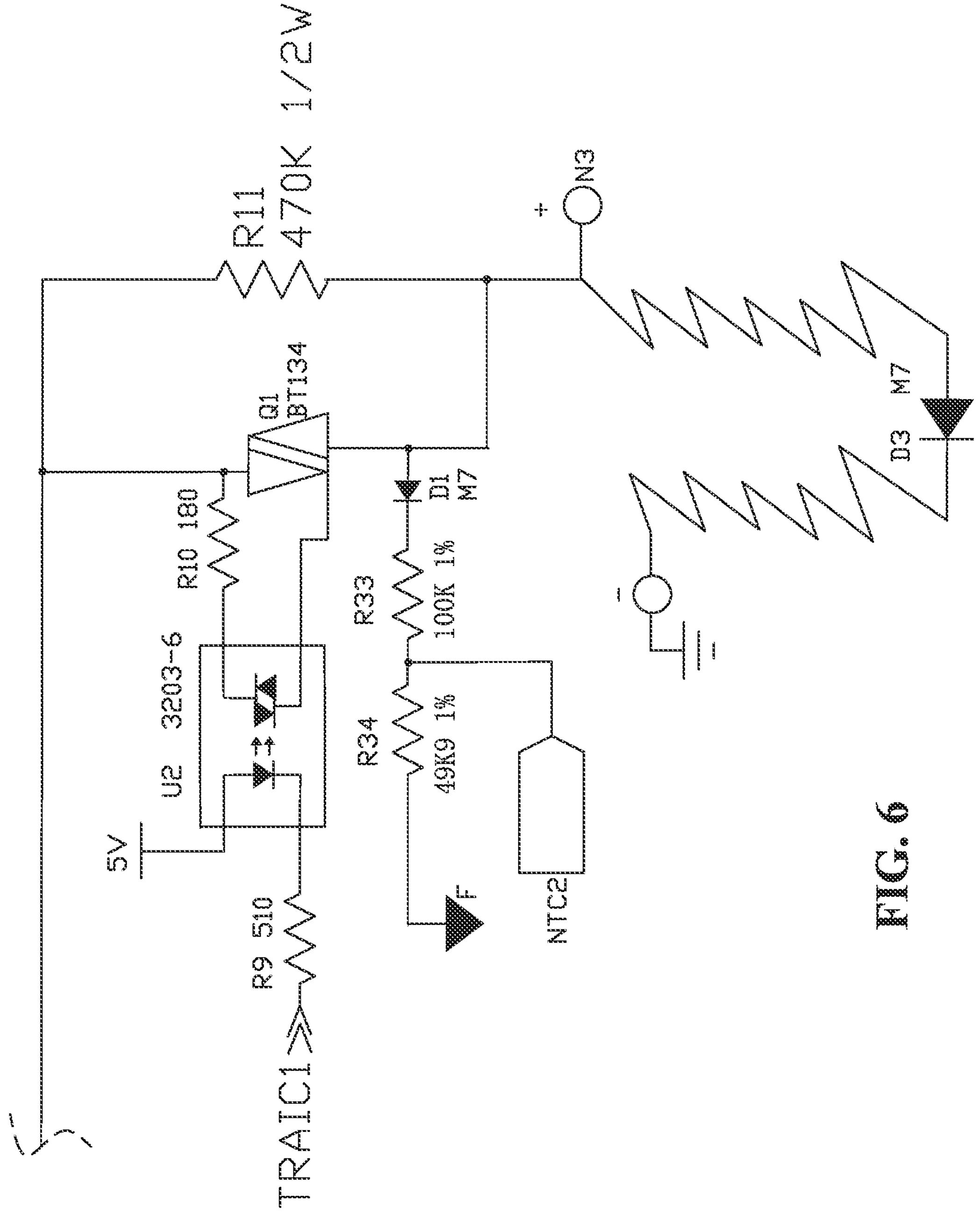
FIG. 6 is a schematic diagram of the output control circuit of the preferred embodiment of the present invention.

As shown in FIG. 6, the output control circuit 224 has an N3 terminal. In this embodiment, the output control circuit 224 includes an optocoupler U2, a resistor R9, a resistor R10, a resistor R11 and a TRIAC (TRIode AC semiconductor switch) Q1.

The positive terminal of a light-emitting device in the optocoupler U2 is electrically connected to the 5V voltage terminal of the voltage conversion circuit 223. The negative terminal of the light-emitting device in the optocoupler U2 is electrically connected to the main control circuit 221 through the resistor R9. One end of a light-receiving device in the optocoupler U2 is electrically connected to the main terminal T2 of the TRIAC Q1 through the resistor R10. The main terminal T2 of the TRIAC Q1 is electrically connected to the voltage conversion circuit 223. The main terminal T1 of the TRIAC Q1 is defined as the N3 terminal. The gate G of the TRIAC Q1 is electrically connected to the other end of the light-receiving device in the optocoupler U2. Both ends of the resistor R11 are electrically connected to the main terminal T2 and the main terminal T1 of the TRIAC Q1, respectively.

Preferably, the output control circuit 224 further includes a diode D1, a resistor R34, and a resistor R33. The anode of the diode D1 is electrically connected to the main terminal T1 of the TRIAC Q1. The resistor R34 and the resistor R33 are connected in series. The connection node of the resistor R34 and the resistor R33 is electrically connected to the main control circuit 221. The other end of the resistor R34 is electrically connected to the voltage conversion circuit 223. The other end of the resistor R33 is electrically connected to the cathode of diode D1.

Figure 4:
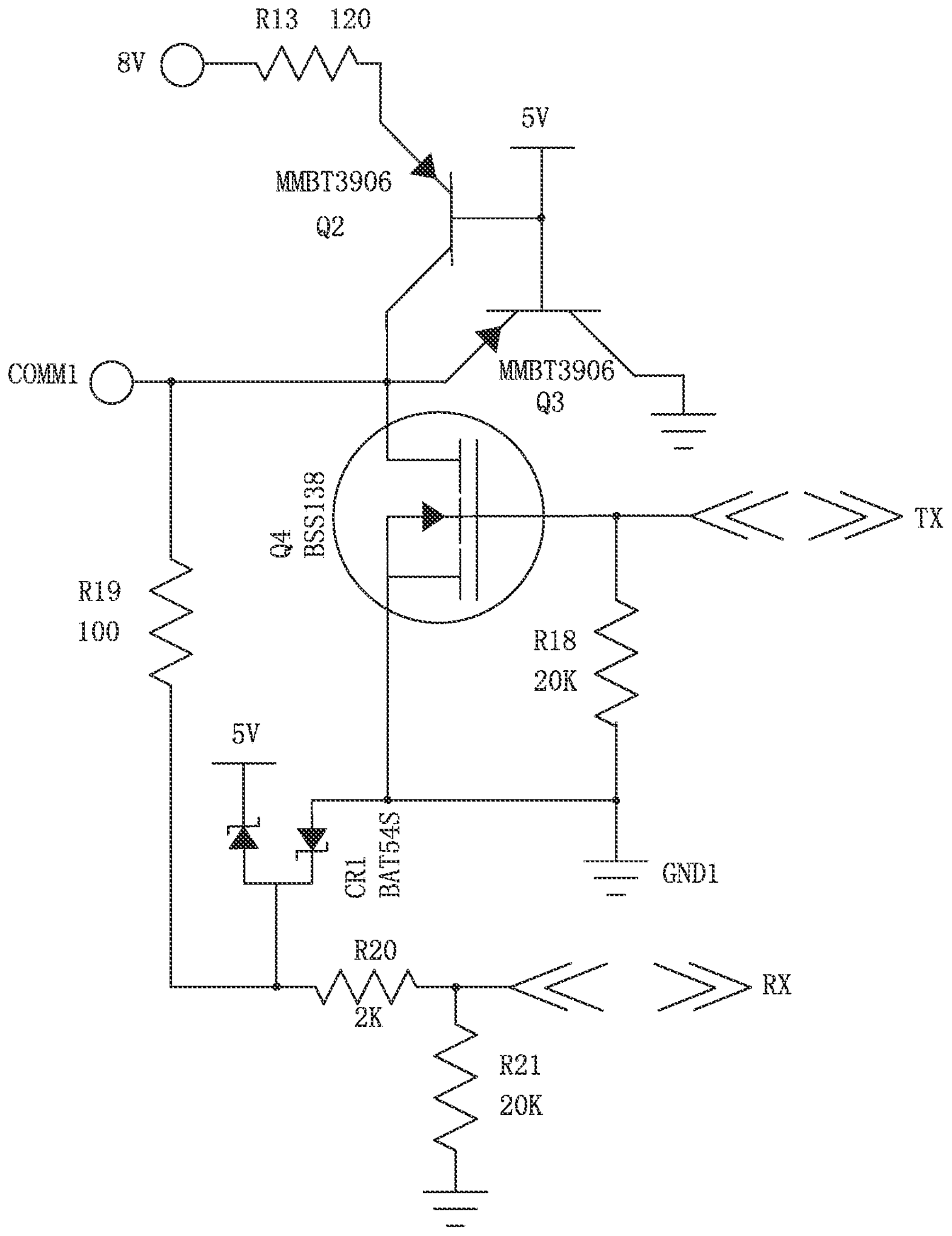
FIG. 4 is a schematic diagram of the first communication power supply circuit of the preferred embodiment of the present invention.

The first communication power supply circuit 225 has a COMM1 terminal and a GND1 terminal. In this embodiment, as shown in FIG. 4, the first communication power supply circuit 225 includes a resistor R13, a transistor Q2, a transistor Q3, a resistor R19, a MOS transistor Q4, a resistor R18, a chip BAT54S, a resistor R20, and a resistor R21.

The emitter of the transistor Q2 is electrically connected to an 8V voltage terminal of the voltage conversion circuit 223 through the resistor R13. Both the base of the transistor Q2 and the base of the transistor Q3 are electrically connected to the 5V voltage terminal of the voltage conversion circuit 223. The collector of the transistor Q2 and the emitter of the transistor Q3 are electrically connected together to form the COMM1 terminal. The collector of transistor Q3 is grounded. The drain of the MOS transistor Q4 is electrically connected to the emitter of the transistor Q3. The gate of the MOS transistor Q4 is electrically connected to the main control circuit 221. The gate of the MOS transistor Q4 is electrically connected to the source of the MOS transistor Q4 through the resistor R18 and is grounded.

The pin 3 of the chip BAT54S is electrically connected to the COMM1 terminal through the resistor R19. The pin 1 of chip BAT54S is defined as the GND1 terminal and grounded. The pin 2 of the chip BAT54S is electrically connected to the 5V voltage terminal of the voltage conversion circuit 223. The main control circuit 221 is electrically connected to the pin 3 of the chip BAT54S through the resistor R20. The main control circuit 221 is also grounded through the resistor R21.

The first interface 23 has a first conductive terminal, a second conductive terminal, and a third conductive terminal. The third conductive terminal is electrically connected to the N3 terminal. The first conductive terminal is electrically connected to the COMM1 terminal. The second conductive terminal is electrically connected to the GND1 terminal. A controller 11 and a second interface 12 are disposed on the outside of the electric blanket body 10. The second interface 12 is pluggably connected to the first interface 23.

Preferably, the controller 11 includes a signal processing circuit 111, a function button circuit 112, and a second communication power supply circuit 113 for separating the power supply and the signal provided by the main control module.

Figure 7:
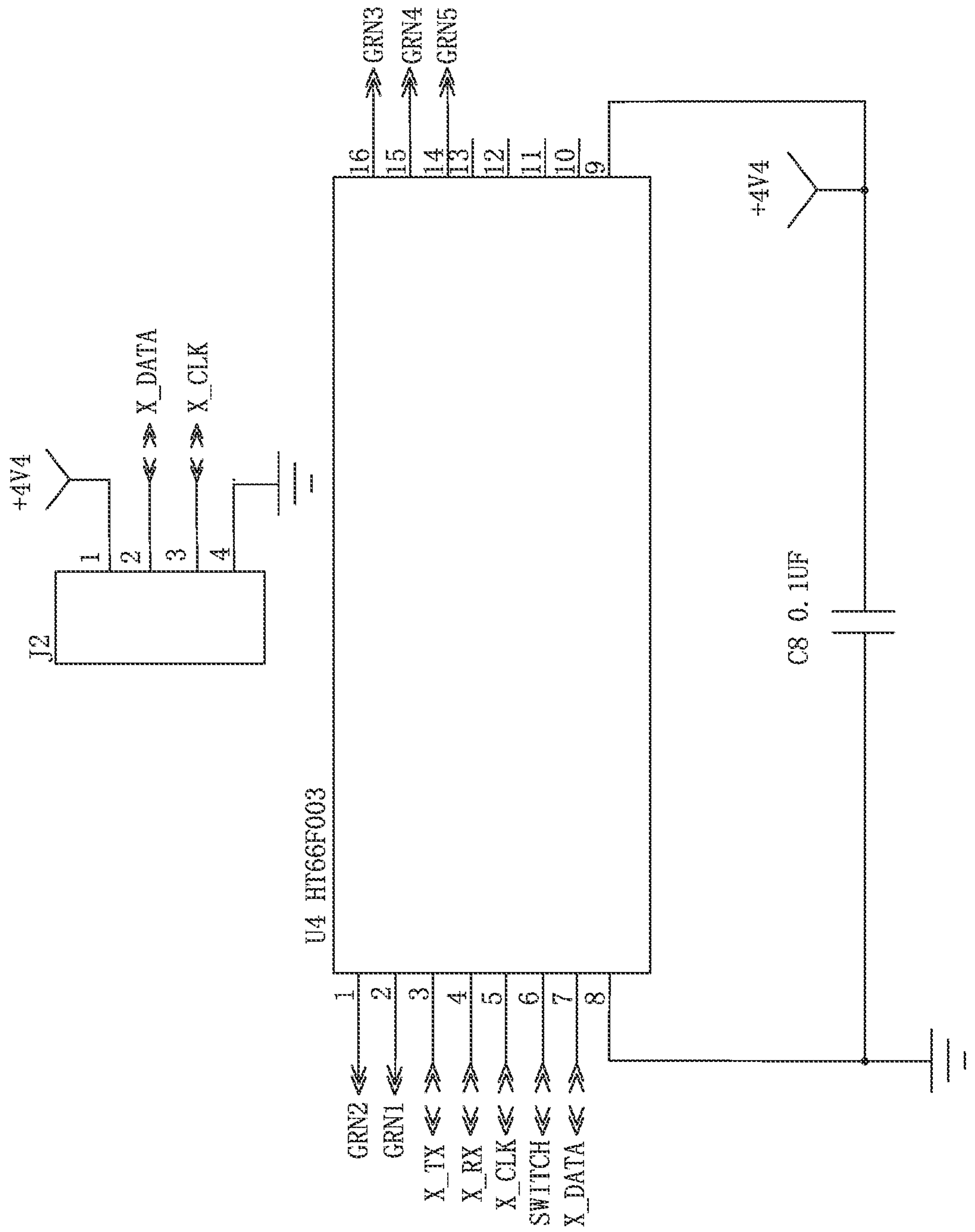
FIG. 7 is a schematic diagram of signal processing circuit of the preferred embodiment of the present invention.

The signal processing circuit 111 is electrically connected to the function button circuit 112 and the second communication power supply circuit 113. In this embodiment, as shown in FIG. 7, the signal processing circuit 111 includes a processing chip U4. The processing chip U4 has processing pins 1 to 16.

Figure 8:
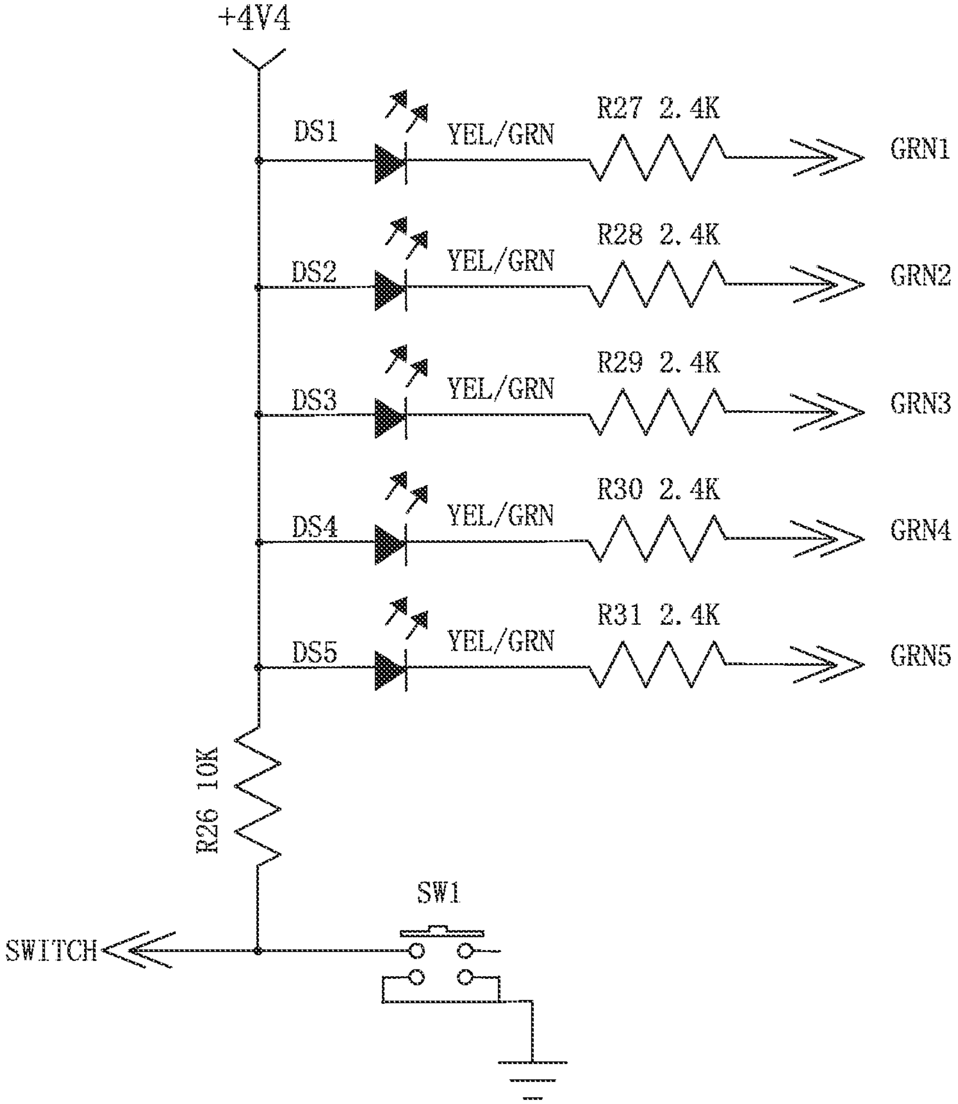
FIG. 8 is a schematic diagram of the function button circuit of the preferred embodiment of the present invention.

The processing pin 3 and the processing pin 4 are electrically connected to the second communication power supply circuit 113, respectively. The processing pin 1, the processing pin 2, the processing pin 6, the processing pin 14, the processing pin 15 and the processing pin 16 are all electrically connected to the function button circuit 112. Preferably, as shown in FIG. 8, the function button circuit 112 includes a button circuit and an indicator circuit. The signal processing circuit is electrically connected to the button circuit and the indicator circuit. The button circuit includes a button SW1. The indicator light circuit includes five sub-indicator indicator circuits. Each sub-indicator circuit includes a resistor and an LED lamp DSX (X is any one of 1 to 5) that are connected in series. In this embodiment, the five sub-indicator circuits are defined as a first sub-indicator circuit, a second sub-indicator circuit, a third sub-indicator circuit, a fourth sub-indicator circuit, and a fifth sub-indicator circuit. The first sub-indicator circuit includes a resistor R27 and an LED lamp DS1. The second sub-indicator circuit includes a resistor R28 and an LED lamp DS2. The third sub-indicator circuit includes a resistor R29 and an LED lamp DS3. The fourth sub-indicator circuit includes a resistor R30 and an LED lamp DS4. The fifth sub-indicator circuit includes a resistor R31 and an LED lamp DS5.

Figure 9:
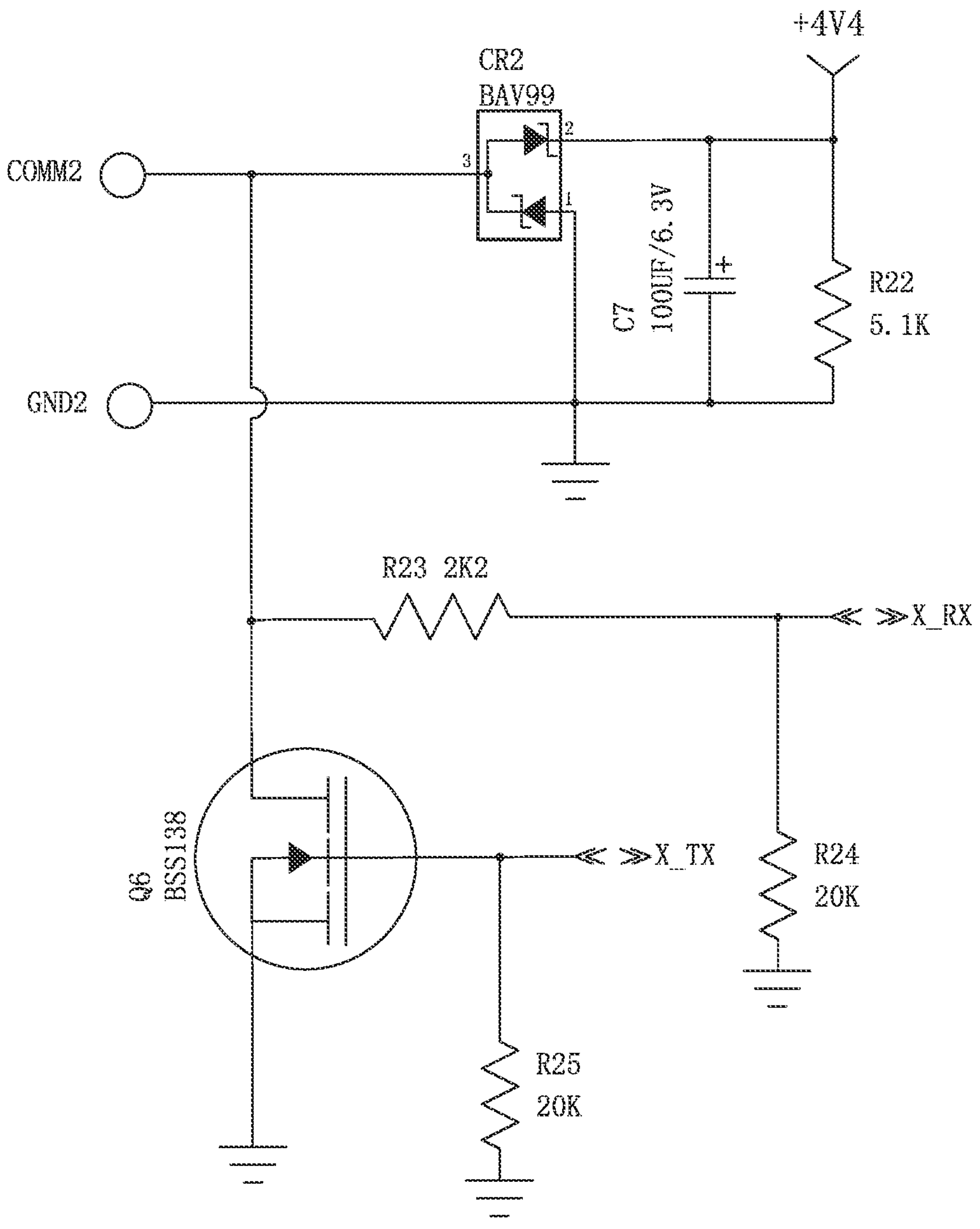
FIG. 9 is a schematic diagram of the second communication power supply circuit of the preferred embodiment of the present invention.

The second communication power supply circuit 113 has a COMM2 terminal and a GND2 terminal. Both the second communication power supply circuit 113 and the first communication power supply circuit 225 realize the combination of signal multiplexing and carrier transmission. In this embodiment, as shown in FIG. 9, the second communication power supply circuit 113 includes a resistor R22, a chip BAV99, a polar capacitor C7, a resistor R23, a resistor R24, a MOS transistor Q6 and a resistor R25.

The pin 3 of the chip BAV99 is defined the COMM2 terminal. The pin 1 of the chip BAV99 is the GND2 terminal and grounded. The pin 2 of the chip BAV99 outputs +4.4V voltage. The positive terminal of the polar capacitor C7 is electrically connected to the pin 2 of the chip BAV99. The negative terminal of the polar capacitor C7 is grounded. The resistor R22 is connected in parallel with the positive and negative terminals of the polar capacitor C7.

The drain of the MOS transistor Q6 is electrically connected to the pin 3 of the chip BAV99. The signal processing circuit 111 is electrically connected to the drain of the MOS transistor Q6 through the resistor R23. The signal processing circuit 111 is also grounded through the resistor R24. The source of the MOS transistor Q6 is grounded. The gate of the MOS transistor Q6 is electrically connected to the signal processing circuit 111. The gate of the MOS transistor Q6 is also grounded through the resistor R25.

The second interface 112 has a fourth conductive terminal, a fifth conductive terminal, and a sixth conductive terminal. The fourth conductive terminal is electrically connected to the COMM2 terminal. The fifth conductive terminal is electrically connected to the GND2 terminal. A heating load 13 is disposed inside the electric blanket body 10. One end of the heating load 13 is electrically connected to the sixth conductive terminal, and the other end of the heating load 13 is electrically connected to the fifth conductive terminal. In this embodiment, the heating load 13 includes a first heating wire, a diode D3 and a second heating wire. One end of the first heating wire is electrically connected to the sixth conductive terminal, and the other end of the first heating wire is electrically connected to the anode of the diode D3. The cathode of the diode D3 is electrically connected to one end of the second heating wire, and the other end of the second heating wire is electrically connected to the fifth conductive terminal.

The first interface 23 is connected to the second interface 12. The third conductive terminal is electrically connected to the sixth conductive terminal. The first conductive terminal is electrically connected to the fourth conductive terminal. The second conductive terminal is electrically connected to the fifth conductive terminal.

What is claimed is:

1. An electric blanket, comprising an electric blanket body and a power supply device for power supply and control;

the power supply device including a power plug for electrical connection to an alternating-current electric power supply, a main control module for voltage conversion and control, and a first interface for electrical connection to the electric blanket body;

the main control module including a main control circuit, an output control circuit, a voltage conversion circuit for converting the alternating-current electric power supply and a first communication power supply circuit for power supply and signal transmission and reception, the main control circuit being electrically connected to the output control circuit and the first communication power supply circuit, the output control circuit having an N3 terminal, the first communication power supply circuit having a COMM1 terminal and a GND1 terminal, the first interface having a first conductive terminal, a second conductive terminal and a third conductive terminal, the third conductive terminal being electrically connected to the N3 terminal, the first conductive terminal being electrically connected to the COMM1 terminal, the second conductive terminal being electrically connected to the GND1 terminal;

a controller and a second interface being disposed on an outside of the electric blanket body, the second interface being pluggably connected to the first interface, the controller including a signal processing circuit, a function button circuit and a second communication power supply circuit for separating a power supply and a signal provided by the main control module, the signal processing circuit being electrically connected to the function button circuit and the second communication power supply circuit, the second communication power supply circuit having a COMM2 terminal and a GND2 terminal;

the second interface having a fourth conductive terminal, a fifth conductive terminal and a sixth conductive terminal, the fourth conductive terminal being electrically connected to the COMM2 terminal, the fifth conductive terminal being electrically connected to the GND2 terminal; a heating load being disposed inside the electric blanket body, one end of the heating load being electrically connected to the sixth conductive terminal, another end of the heating load being electrically connected to the fifth conductive terminal;

the first interface being connected to the second interface, the third conductive terminal being electrically connected to the sixth conductive terminal, the first conductive terminal being electrically connected to the fourth conductive terminal, the second conductive terminal being electrically connected to the fifth conductive terminal.

2. The electric blanket as claimed in claim 1, wherein the signal processing circuit includes a processing chip U4, and the processing chip U4 has processing pins 1 to 16;

the processing pin 3 and the processing pin 4 are electrically connected to the second communication power supply circuit, and the processing pin 1, the processing pin 2, tile processing pin 6, the processing pin 14, the processing pin 15 and the processing pin 16 are all electrically connected to the function button circuit.

3. The electric blanket as claimed in claim 1, wherein the second communication power supply circuit includes a resistor R22, a chip BAV99, a polar capacitor C7, a resistor R23, a resistor R24, a MOS transistor Q6 and a resistor R25;

a pin 3 of the chip BAV99 is defined as the COMM2 terminal, a pin 1 of the chip BAV99 is defined as the GND2 terminal and grounded, a pin 2 of the chip BAV99 outputs +4.4V voltage, a positive terminal of the polar capacitor C7 is electrically connected to the pin 2 of the chip BAV99, a negative terminal of the polar capacitor C7 is grounded, the resistor R22 is connected in parallel with the positive and negative terminals of the polar capacitor C7;

a drain of the MOS transistor Q6 is electrically connected to the pin 3 of the chip BAV99, the signal processing circuit is electrically connected to the drain of the MOS transistor Q6 through the resistor R23, the signal processing circuit is further grounded through the resistor R24, a source of the MOS transistor Q6 is grounded, a gate of the MOS transistor Q6 is electrically connected to the signal processing circuit, and the gate of the MOS transistor Q6 is further grounded through the resistor R25.

4. The electric blanket as claimed in claim 1, wherein the main control circuit includes a main control chip U3, an indicator LED1 and a resistor R12, the main control chip U3 has main control pins 1 to 20;

the main control pin 11 is electrically connected to a cathode of the indicator LED1 through the resistor R12, an anode of the indicator LED1 is electrically connected to a 5V voltage terminal of the voltage conversion circuit, the main control pin 13 and the main control pin 14 are electrically connected to the first communication power supply circuit, and the main control pin 4 and the main control pin 12 are electrically connected to the output control circuit.

5. The electric blanket as claimed in claim 4, wherein the main control module further includes a current detection circuit, the current detection circuit includes a resistor R6 and a resistor R3 that are connected in series, a connection node of the resistor R6 and the resistor R3 is grounded, another end of the resistor R6 is electrically connected to the main control pin 16, and another end of the resistor R3 is electrically connected to the voltage conversion circuit.

6. The electric blanket as claimed in claim 4, wherein the main control module further includes a voltage detection circuit, e voltage detection circuit includes a resistor R7 and a resistor R8 that are connected in series, a connection node of resistor R7 and resistor R8 is electrically connected to the main control pin 16, another end of the resistor R8 is grounded, and another end of the resistor R7 is electrically connected to the voltage conversion circuit.

7. The electric blanket as claimed in claim 1, wherein the first communication power supply circuit includes a resistor R13, a transistor Q2, a transistor Q3, a resistor R19, a MOS transistor Q4, a resistor R18, a chip BAT54S, a resistor R20, and a resistor R21;

an emitter of the transistor is electrically connected to a 8V voltage terminal of the voltage conversion circuit through the resistor R13, a base of the transistor Q2 and a base of the transistor Q3 are electrically connected to the 5V voltage terminal of the voltage conversion circuit, a collector of the transistor Q2 and an emitter of the transistor Q3 are electrically connected together to form the COMM1 terminal, a collector of transistor Q3 is grounded, a drain of the MOS transistor Q4 is electrically connected to the emitter of the transistor Q3, a gate of the MOS transistor Q4 is electrically connected to the main control circuit, the gate of the MOS transistor Q4 is electrically connected to a source of the MOS transistor Q4 through the resistor R18 and is grounded;

a pin 3 of the chip BATS4S is electrically connected to the COMM1 terminal through the resistor R19, a pin 1 of chip BAT54S is defined as the GND1 terminal and grounded, a pin 2 of the chip BAT54S is electrically connected to the 5V voltage terminal of the voltage conversion circuit, the main control circuit is electrically connected to the pin 3 of the chip BATS4S through the resistor R20, and the main control circuit is further grounded through the resistor R21.

8. The electric blanket as claimed claim 1, wherein the output control circuit includes an optocoupler U2, a resistor R9, a resistor R10, a resistor R11 and a TRIAC (TRIode AC semiconductor switch) Q1;

a positive terminal of a light-emitting device in the optocoupler U2 is electrically connected to the 5V voltage terminal of the voltage conversion circuit, a negative terminal of the light-emitting device in the optocoupler U2 is electrically connected to the main control circuit through the resistor R9, one end of a light-receiving device in the optocoupler U2 is electrically connected to a main terminal T2 of the TRIAC Q1 through the resistor R10, the main terminal T2 of the TRIAC Q1 is electrically connected to the voltage conversion circuit, a main terminal T1 of the TRIAC Q1 is defined as the N3 terminal, a gate G of the TRIAC Q1 is electrically connected to another end of the light-receiving device in the optocoupler U2, and both ends of the resistor R11 are electrically connected to the main terminal T2 and tire main terminal T1 of the TRIAC Q1, respectively.

9. The electric blanket as claimed in claim 8, wherein the output control circuit further includes a diode D1, a resistor R34 and a resistor R33, an anode of the diode D1 is electrically connected to the main terminal T1 of the TRIAC Q1, the resistor R34 and the resistor R33 are connected in series, a connection node of the resistor R34 and the resistor R33 is electrically connected to the main control circuit, another end of the resistor R34 is electrically connected to the voltage conversion circuit, and another end of the resistor R33 is electrically connected to a cathode of diode D1.

10. The electric blanket as claimed in claim 1, wherein the function button circuit includes a button circuit and an indicator circuit, and the signal processing circuit is electrically connected to the button circuit and the indicator circuit.

* * * * *